US006821558B2

United States Patent
Zhao et al.

(10) Patent No.: US 6,821,558 B2
(45) Date of Patent: Nov. 23, 2004

(54) METHOD FOR DIRECT APPLICATION OF FLUX TO A BRAZING SURFACE

(75) Inventors: Zhibo Zhao, Ann Arbor, MI (US); Bryan A. Gillispie, Warren, MI (US); John R. Smith, Birmingham, MI (US); Thomas Hubert Van Steenkiste, Ray, MI (US); Yang Luo, East Amherst, NY (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/202,308

(22) Filed: Jul. 24, 2002

(65) Prior Publication Data

US 2004/0016793 A1 Jan. 29, 2004

(51) Int. Cl.[7] ............................. B05D 1/02; B05D 1/36
(52) U.S. Cl. ...................... 427/202; 427/205; 427/192; 427/199
(58) Field of Search ................................. 427/180, 191, 427/192, 199, 202, 205, 446, 449, 452–456; 148/537

(56) References Cited

U.S. PATENT DOCUMENTS

| | | |
|---|---|---|
| 3,100,724 A | 8/1963 | Rocheville |
| 3,993,411 A | 11/1976 | Babcock et al. |
| 4,263,335 A | 4/1981 | Wagner et al. |
| 4,606,495 A | 8/1986 | Stewart, Jr. et al. |
| 4,891,275 A | 1/1990 | Knoll |
| 4,939,022 A | 7/1990 | Palanisamy |
| 5,187,021 A | 2/1993 | Vydra et al. |
| 5,271,965 A | 12/1993 | Browning |
| 5,302,414 A | 4/1994 | Alknimor et al. |
| 5,340,015 A | 8/1994 | Hira et al. |
| 5,395,679 A | 3/1995 | Myers et al. |
| 5,424,101 A | 6/1995 | Atkins et al. |
| 5,464,146 A | 11/1995 | Zalvzec et al. |
| 5,476,725 A | 12/1995 | Papich et al. |
| 5,527,627 A | 6/1996 | Lautzenhiser et al. |
| 5,593,740 A | 1/1997 | Strumbon et al. |
| 5,795,626 A | 8/1998 | Grabel et al. |
| 5,854,966 A | 12/1998 | Kampe et al. |
| 5,875,830 A | 3/1999 | Singer et al. |
| 5,894,054 A | 4/1999 | Paruchuri et al. |
| 5,907,761 A | 5/1999 | Tohma et al. |
| 5,952,056 A | 9/1999 | Jordan et al. |
| 5,989,310 A | 11/1999 | Chu et al. |
| 6,033,622 A | 3/2000 | Maruyama |
| 6,051,045 A | 4/2000 | Narula et al. |
| 6,051,277 A | 4/2000 | Claussen et al. |
| 6,074,737 A | 6/2000 | Jordan et al. |
| 6,129,948 A | 10/2000 | Plummer et al. |
| 6,139,913 A * | 10/2000 | Van Steenkiste et al. |
| 6,283,386 B1 | 9/2001 | Van Steenkiste et al. |
| 6,446,857 B1 | 9/2002 | Kent et al. |
| 6,615,488 B2 | 9/2003 | Anders et al. |
| 2001/0001042 A1 * | 5/2001 | Sinatra et al. |
| 2002/0168466 A1 * | 11/2002 | Tappham et al. |

OTHER PUBLICATIONS

Van Steenkiste, et al; *Kinetic Spray Coatings*; in Surface & Coatings Technology III; 1999; pp. 62–71.

Liu, et al; *Recent Development in the Fabrication of Metal Matrix–Particulate Composites Using Powder Metallurgy Techniques*; in Journal of Material Science 29; 1994; pp. 1999–2007: National University of Singapore, Japan.

(List continued on next page.)

*Primary Examiner*—Fred J. Parker
(74) *Attorney, Agent, or Firm*—Scott A. McBain (57) ABSTRACT

A method is for direct application of a brazing flux material to a brazing surface. The method includes the step of applying a brazing filler material to a substrate utilizing a kinetic spray process to form a brazing surface. Following application of the brazing filler material to the substrate brazing flux material can be directly applied to the brazing surface as either a dry powder or a wet slurry. The nature of the brazing surface allows the applied flux material to adhere to the surface without the utilization of additional binders or resin materials.

25 Claims, 9 Drawing Sheets

OTHER PUBLICATIONS

Papyrin; *The Cold Gas–Dynamic Spraying Method a New Method for Coatings Deposition Promises a New Generation of Technologies; Novosibirsk, Russia.*

McCune, al; *Characterization of Copper and Steel Coatings Made by the Cold Gas–Dynamic Spray Method*; National Thermal Spray Conference.

Alkhimov, et al; *A Method of "Cold" Gas–Dynamic Deposition; Sov. Phys. Kokl. 36*(12); Dec. 1990; pp. 1047–1049.

Dykuizen, et al; *Impact of High Velocity Cold Spray Particles*; in Journal of Thermal Spray Technology 8(4); 1999; pp. 559–564.

Swartz, et al; *Thermal Resistance At Interfaces; Appl. Phys. Lett.*, vol. 51, No. 26,28; Dec. 1987; pp. 2201–2202.

Davis, et al; *Thermal Conductivity of Metal–Matrix Composlites; J.Appl. Phys. 77*(10), May 15, 1995; pp. 4494–4960.

Stoner et al; *Measurements of the Kapitza Conductance between Diamond and Several Metals*; Physical Review Letters, vol. 68, No. 10; Mar. 9, 1992; pp. 1563–1566.

Stoner et al; *Kapitza conductance and heat flow between solids at temperatures from 50 to 300k*; Physical Review B, vol. 48, No. 22, Dec. 1, 1993–II; pp. 16374;16387.

Johnson et al; *Diamond/Al metal matrix composites formed by the pressureless metal infiltration process*; J. Mater, Res., vol. 8, No. 5, May 1993; pp. 11691173.

Rajan et al; *Reinforcement coatings and interfaces in Aluminum Metal Matrix Composites*; pp. 3491–3503.

*LEC Manufacturing and Engineering Capabilities*; Lanxide Electronic Components, Inc.

Dykhuizen et al; *Gas Dynamic Principles of Cold Spray*; Journal of Thermal Spray Technology: 06–98; pp. 205–212.

McCune et al; *An Exploration of the Cold Gas–Dynamic Spray Method For Several Materials Systems.*

Ibrahim et al; *Particulate Reinforced Metal Matrix Composites—A Review; Journal of Matrials Science 26*; pp. 1137–1156.

\* cited by examiner

METHOD FOR DIRECT APPLICATION OF FLUX TO A BRAZING SURFACE

TECHNICAL FIELD

The present invention is directed toward the art of brazing, and more particularly, to a method for direct application of a brazing flux to a brazing surface.

BACKGROUND OF THE INVENTION

Brazing is a process that involves the joining of components with a brazing filler material whose melting point is lower than that of either of the components. The brazing process is typically used to join components that are either metals or alloys. Typically, the brazing filler material is placed adjacent to or in between the two components to be joined and the assembly is then heated to a temperature where the brazing filler material melts but not the components. Upon cooling, the brazing filler material forms a metallurgical bond between the two surfaces of the components. Often, the surfaces to be joined include surface metal oxide layers that can prevent formation of a good brazing joint between the surfaces. Therefore, it is typical to include a brazing flux material in addition to the brazing filler material. Typical brazing fluxes contain either chlorides and/or fluorides and the flux material typically melts at a lower temperature than the brazing filler material. Once molten, the brazing flux material works to dissolve the hard shell of metal oxides on the two surfaces, which enhances the wetting and flow of the molten brazing filler material, thereby allowing it to be drawn freely by capillary force between the joints of the components to be brazed. The composition of the brazing filler material is determined by the composition of the surfaces to be joined as is known by those of ordinary skill in the art. Likewise, there are numerous brazing flux materials that are available and the particular one utilized depends on the identity of the components to be brazed. Typically, when brazing aluminum components the industry utilizes the flux, NOCOLOCK® manufactured by Solvay Fluor. This flux comprises a mixture of potassium fluoraluminates.

In current manufacturing processes, application of the brazing flux to the brazing surface prior to brazing of the apparatus is a difficult process. Typically, the brazing filler material is applied to one of the surfaces to be joined and the apparatus is pre-assembled. After pre-assembly the entire apparatus is often dipped in a water-flux slurry or such a water-flux slurry is sprayed onto the entire assembly. Alternatively, the flux material is applied on the entire apparatus via a static dry powder process. As discussed above, the flux is actually only required at the localized areas where the two surfaces are being joined. The entire fluxed apparatus is then passed into a brazing furnace where the brazing flux material becomes a liquid and tends to drip from the apparatus forming very hard residues inside the brazing furnace, which requires the furnace to be shut down and cleaned periodically. In addition, the heated brazing flux material generates fumes that must be treated prior to release into the atmosphere. Often brazing fluxes will not adhere well to a brazing surface and thus one is required to include additional binders and resins in order to adhere the brazing flux material to the brazing surface. Finally, these processes are wasteful because of the excess flux material that must be used.

It would be advantageous to provide a method for direct application of a brazing flux material onto a brazing surface that was simple and allowed the brazing surface with applied flux material to be handled extensively prior to the brazing process. With such a method only the brazing surface and not an entire assembly would have to be fluxed, significantly lessening the capital investment, footprint of the fluxing apparatus, amount of required flux material, and the labor required for the fluxing process.

SUMMARY OF THE INVENTION

In one embodiment, the present invention comprises a method for application of a brazing flux material to a brazing surface comprising the steps of: applying a brazing filler material directly onto a substrate by a kinetic spray application to form a brazing surface and subsequently depositing a brazing flux material directly onto the formed brazing surface.

In another embodiment, the present invention comprises a method for application of a brazing flux material to a brazing surface that comprises the steps of: providing a brazing filler material as a particle mixture, entraining the particle mixture into a flow of a gas, the gas at a temperature insufficient to cause thermal softening of the particle mixture, directing the particle mixture entrained in the flow of gas through a supersonic nozzle placed opposite a substrate and accelerating the particle mixture to a velocity sufficient to result in adherence of the particle mixture onto the substrate thereby forming a brazing surface by a kinetic spray application, and then depositing a brazing flux material directly onto the formed brazing surface.

DESCRIPTION OF THE PREFERRED EMBODIMENT

The present invention comprises a method for formation of a brazing surface by a kinetic spray application of a brazing filler material directly onto a substrate and direct application of a brazing flux onto the formed brazing surface. The method includes use of a kinetic spray process as generally described in U.S. Pat. Nos. 6,139,913, 6,283,386 and an article by Van Steenkiste, et al. entitled "Aluminum coatings via kinetic spray with relatively large powder particles" published in Surface and Coatings Technology 154, pages 237–252, 2002, all of which are herein incorporated by reference.

Figure 1:
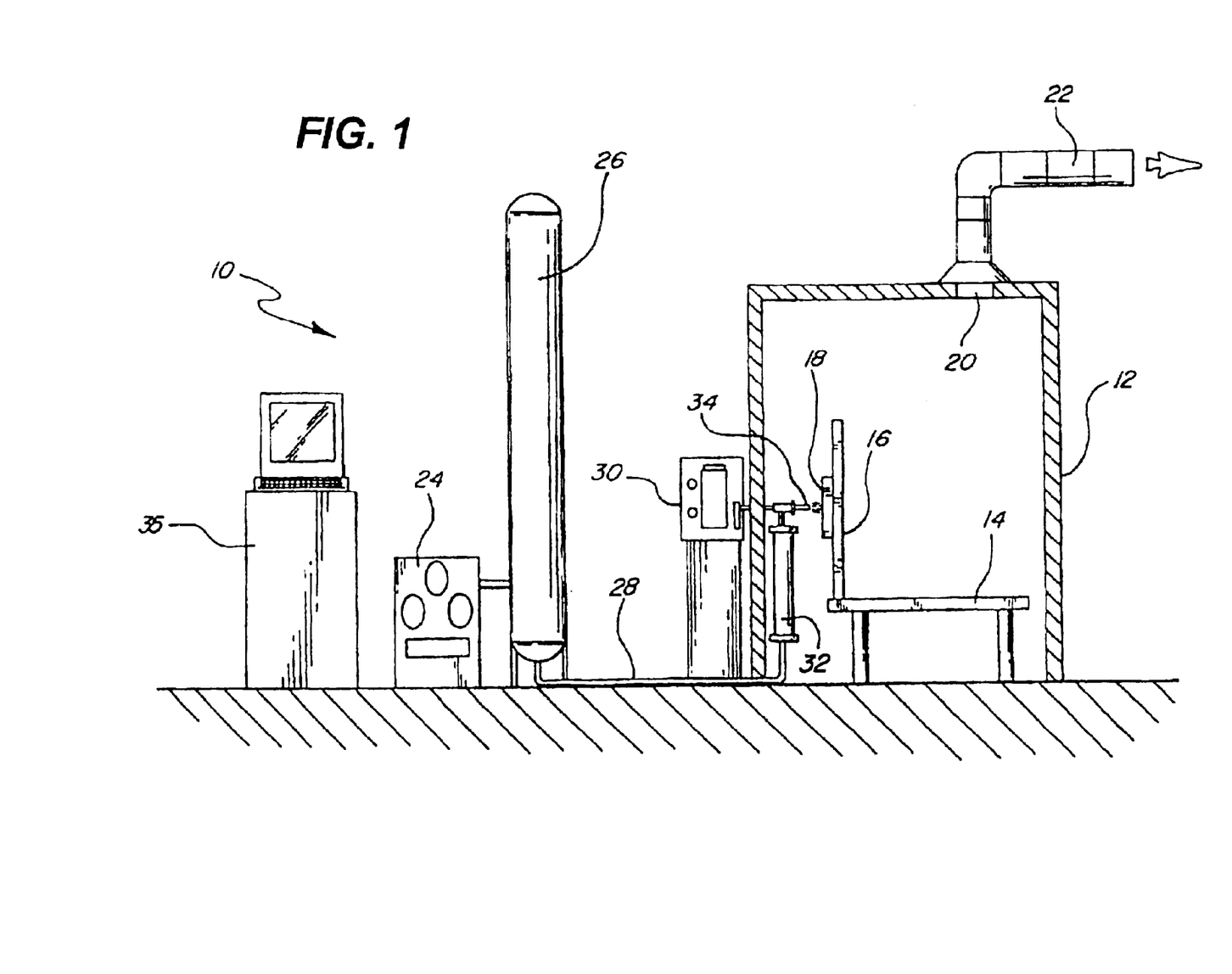
FIG. 1 is a kinetic spray system for use in the present invention.

Referring first to FIG. 1, a kinetic spray system for use according to the present invention is generally shown at 10. System 10 includes an enclosure 12 in which a support table 14 or other support means is located. A mounting panel 16 fixed to the table 14 supports a work holder 18 for holding the substrate to be coated. In one embodiment, the work holder 18 is capable of movement in three dimensions and is able to support a suitable substrate to be coated. In another embodiment, the work holder 18 is capable of feeding a substrate to be coated past a kinetic spray nozzle 34, described below. The enclosure 12 includes surrounding walls having at least one air inlet, not shown, and an air outlet 20 connected by a suitable exhaust conduit 22 to a dust collector, not shown. During coating operations, the dust collector continually draws air from the enclosure 12 and collects any dust or particles contained in the exhaust air for subsequent disposal.

The spray system 10 further includes an air compressor 24 capable of supplying air pressure up to 3.4 MPa (500 psi) to a high pressure air ballast tank 26. The air ballast tank 26 is connected through a line 28 to both a high pressure powder feeder 30 and a separate air heater 32. The air heater 32 supplies high pressure heated air, the main gas described below, to a kinetic spray nozzle 34. The temperature of the main gas varies from 100 to 3000° C., depending on the powder or powders being sprayed. The pressure of the main gas and the powder feeder 30 varies from 200 to 500 psi. The powder feeder 30 mixes particles of a single powder or a mixture of particles with unheated high-pressure air and supplies the particle mixture to a supplemental inlet line 48 of the nozzle 34. The particles utilized in the present invention comprise the selected brazing filler material. Generally, the brazing filler material comprises a metal, an alloy or mixtures thereof, examples are provided below. A computer control 35 operates to control both the pressure of air supplied to the air heater 32 and the temperature of the heated main gas exiting the air heater 32. As would be understood by one of ordinary skill in the art, the system 10 can include multiple powder feeders 30, all of which are connected to one or more supplemental feedline(s) 48. For clarity only one powder feeder 30 is shown in FIG. 1.

Figure 2:
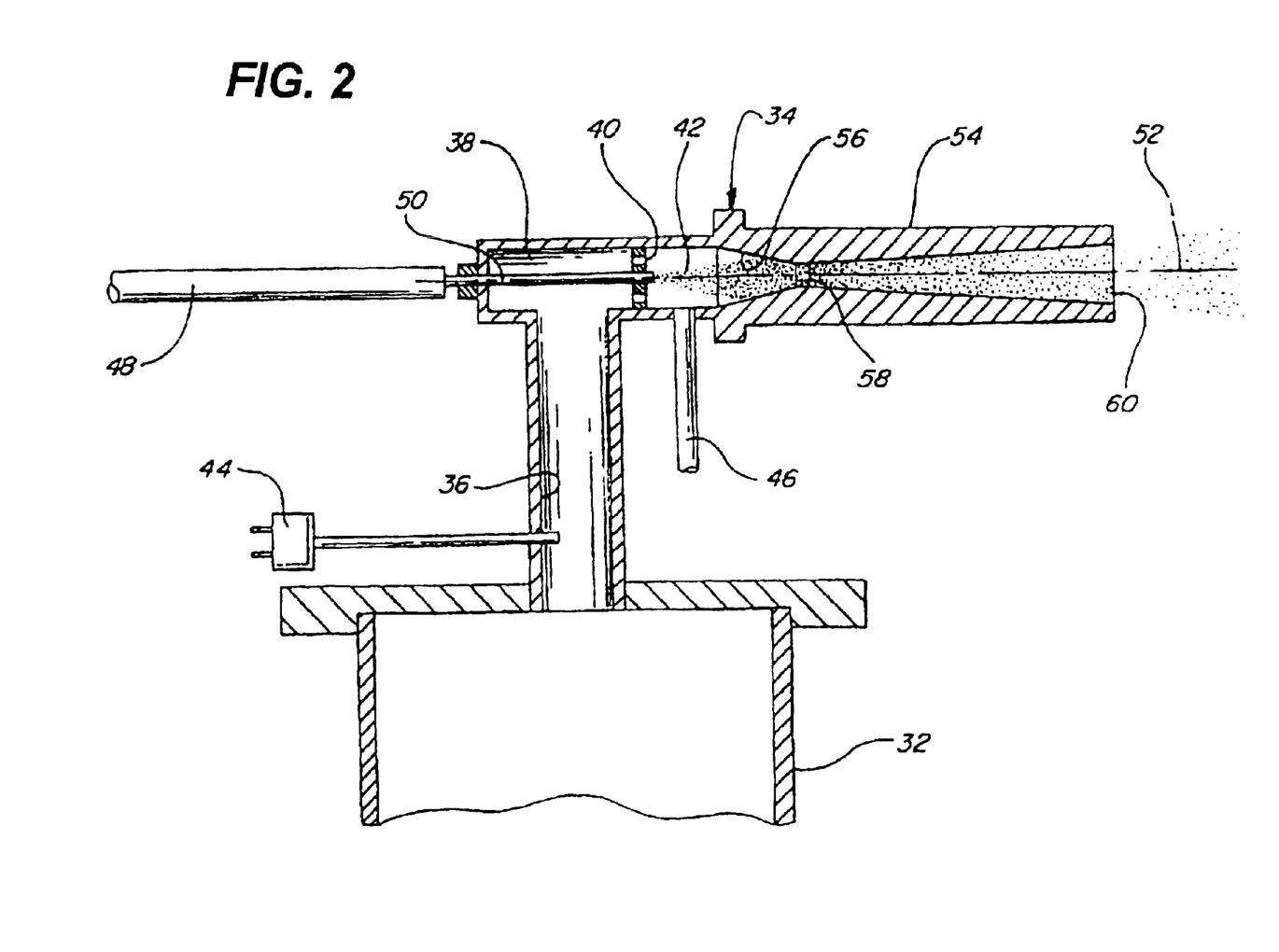
FIG. 2 is a cross-sectional view of a kinetic spray nozzle for use in the present invention.

FIG. 2 is a cross-sectional view of the nozzle 34 and its connections to the air heater 32 and the supplemental inlet line 48. A main air passage 36 connects the air heater 32 to the nozzle 34. Passage 36 connects with a premix chamber 38 which directs air through a flow straightener 40 and into a mixing chamber 42. Temperature and pressure of the air or other heated main gas are monitored by a gas inlet temperature thermocouple 44 in the passage 36 and a pressure sensor 46 connected to the mixing chamber 42.

The mixture of unheated high pressure air and particle powder is fed through the supplemental inlet line 48 to a powder injector tube 50 comprising a straight pipe having a predetermined inner diameter. The predetermined diameter can range from 0.40 to 3.00 millimeters. Preferably it ranges from 0.40 to 0.90 millimeters in diameter. The tube 50 has a central axis 52 which is preferentially the same as the axis of the premix chamber 38. The tube 50 extends through the premix chamber 38 and the flow straightener 40 into the mixing chamber 42.

Mixing chamber 42 is in communication with the de Laval type nozzle 54. The nozzle 54 has an entrance cone 56 that decreases in diameter to a throat 58. Downstream of the throat is an exit end 60. The largest diameter of the entrance cone 56 may range from 10 to 6 millimeters, with 7.5 millimeters being preferred. The entrance cone 56 narrows to the throat 58. The throat 58 may have a diameter of from 3.5 to 1.5 millimeters, with from 3 to 2 millimeters being preferred. The portion of the nozzle 54 from downstream of the throat 58 to the exit end 60 may have a variety of shapes, but in a preferred embodiment it has a rectangular cross-sectional shape. At the exit end 60 the nozzle 54 preferably has a rectangular shape with a long dimension of from 8 to 14 millimeters by a short dimension of from 2 to 6 millimeters. The distance from the throat 58 to the exit end 60 may vary from 60 to 400 millimeters.

As disclosed in U.S. Pat. Nos. 6,139,913 and 6,283,386 the powder injector tube 50 supplies a particle powder mixture to the system 10 under a pressure in excess of the pressure of the heated main gas from the passage 36. The nozzle 54 produces an exit velocity of the entrained particles of from 300 meters per second to as high as 1200 meters per second. The entrained particles gain kinetic and thermal energy during their flow through this nozzle 54. It will be recognized by those of skill in the art that the temperature of the particles in the gas stream will vary depending on the particle size and the main gas temperature. The main gas temperature is defined as the temperature of heated high-pressure gas at the inlet to the nozzle 54. These temperatures and the exposure time of the particles are kept low enough that the particles are always at a temperature below their melting temperature so, even upon impact, there is no change in the solid phase of the original particles due to transfer of kinetic and thermal energy, and therefore no change in their original physical properties. The particles exiting the nozzle 54 are directed toward a surface of a substrate to coat it.

Upon striking a substrate opposite the nozzle 54 the particles flatten into a nub-like structure with an aspect ratio of generally about 5 to 1. When the substrate is a metal or alloy and the particles include a metal or an alloy, all the particles striking the substrate surface fracture the oxidation on the surface layer and the metal or alloy particles subsequently form a direct metal-to-metal bond between the particle and the substrate. Upon impact the kinetic sprayed particles transfer substantially all of their kinetic and thermal energy to the substrate surface and stick if their yield stress has been exceeded. As discussed above, for a given particle to adhere to a substrate it is necessary that it reach or exceed its critical velocity which is defined as the velocity where at it will adhere to a substrate when it strikes the substrate after exiting the nozzle 54. This critical velocity is dependent on the material composition of the particle. In general, harder materials must achieve a higher critical velocity before they adhere to a given substrate. It is not known at this time exactly what is the nature of the particle to substrate bond; however, it is believed that a portion of the bond is due to the particles plastically deforming upon striking the substrate.

Figure 3:
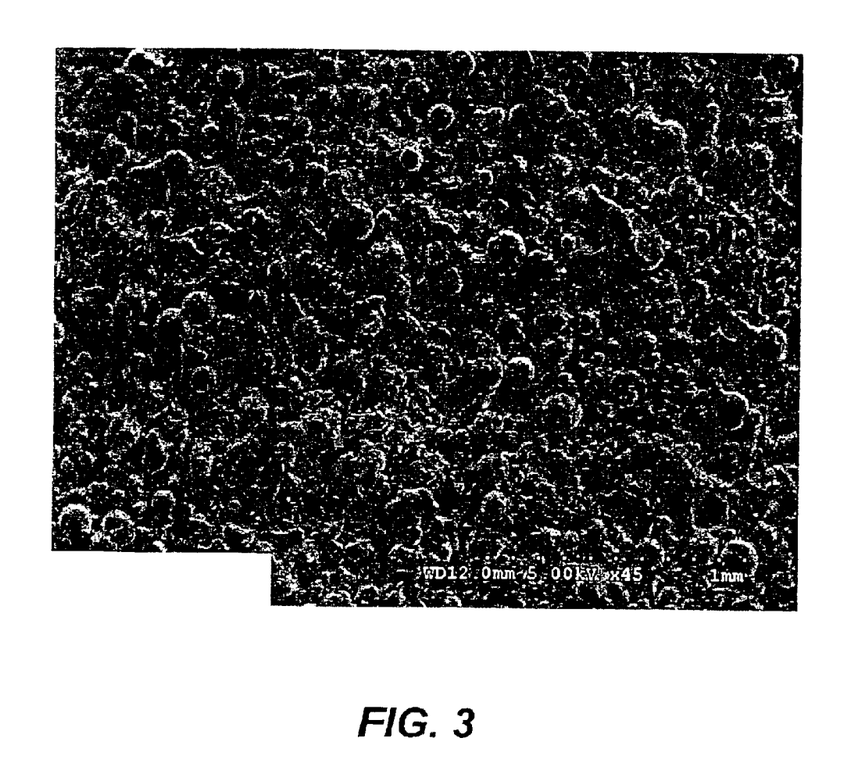
FIG. 3 is a scanning electron micrograph photograph of a plane view of a substrate having applied thereto a brazing filler material by a kinetic spray application according to the present invention.

The kinetic spray system 10 is extremely versatile in producing any of a variety of coatings. The kinetic spray system 10 is utilized to apply a brazing filler material to one of the two substrates to be joined to each other. The brazing filler material is provided as a particle mixture and preferably the powders have an average nominal particle size of from 25 to 200 microns in diameter and more preferably from 50 to 200 microns in diameter. As discussed above, the material chosen as the brazing filler material may comprise either a metal or an alloy and its composition is dependent on the composition of the substrates to be joined. For example, when brazing aluminum substrates to each other it is preferable that the filler material comprise a ternary mixture of aluminum, zinc, and silicon. Preferably, the ternary mixture comprises from 50 to 78% by weight aluminum, 12 to 45% by weight zinc, and 5 to 10% by weight silicon with all the weights based on the total weight of the brazing filler material. The zinc provides corrosion resistance to the brazing filler material. Other brazing filler materials, however, can be utilized such as, for example: silicon; silicon and aluminum; and silicon, aluminum, zinc, and copper. As discussed above, the system 10 includes a work holder 18 that is capable of moving in three dimensions in one embodiment. Thus, a substrate to be coated by the brazing fill material could be mounted in work holder 18 and manipulated in front of nozzle 34 to precisely delineate the area of brazing surface that was desired to be generated. In another embodiment, work holder 18 can be utilized to feed a piece of substrate past nozzle 34 at a rate of, for example, from 0.5 to 10" per second thereby enabling a high speed production coating of a substrate surface with the brazing fill material. When the brazing filler material is applied to a substrate by the kinetic spray process it produces a rough coating layer having a series of "hills and valleys" as shown in FIG. 3. FIG. 3 shows a scanning electron micrograph photograph of a kinetically sprayed brazing surface that was sprayed with a brazing filler material comprising a mixture of aluminum, zinc, and silicon. The stand-off distance from the nozzle 34 to the substrate was approximately 2 centimeters. It is preferable to load a substrate with from 50 to 100 grams per meter squared of brazing filler material.

Figure 4A:
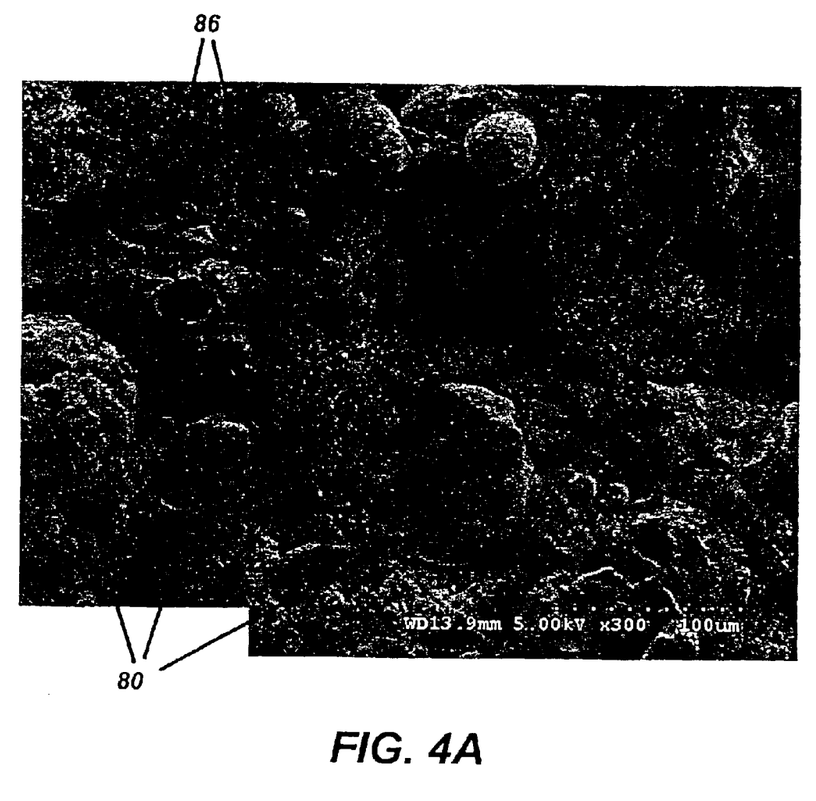
FIG. 4A is a scanning electron micrograph photograph of a plane view of a brazing surface having applied thereto 10 grams per meter squared of a dry brazing flux material according to the present invention.
Figure 4B:
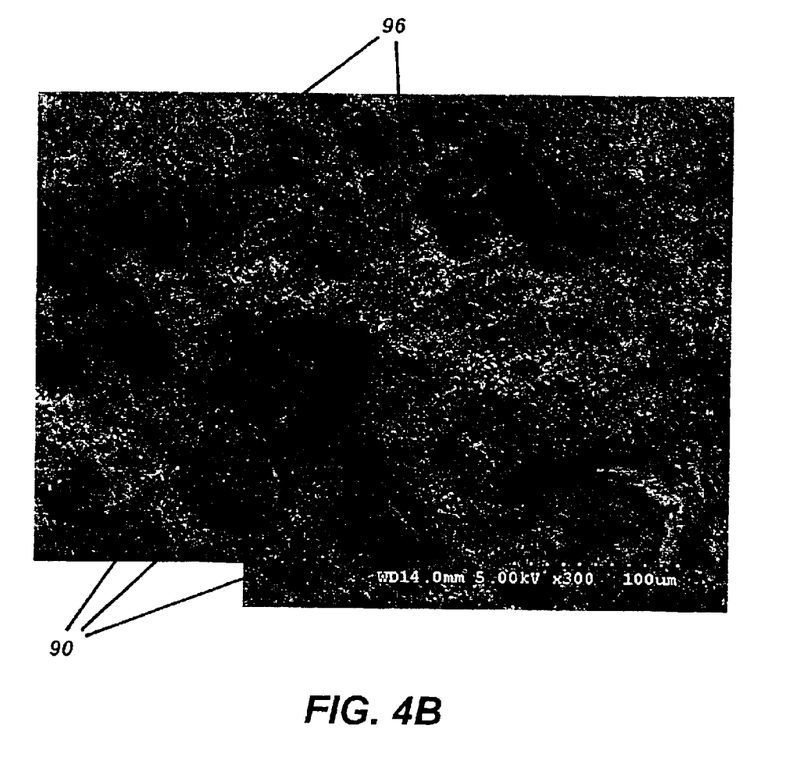
FIG. 4B is a scanning electron micrograph photograph of a plane view of a brazing surface having applied thereto 40 grams per meter squared of a dry brazing flux material according to the present invention.

The flux material can be any of the fluxes that are known to those in the art. These include well known fluxes such as the potassium fluoraluminates sold under the name NOCOLOCK®. The composition of the flux utilized is dependent on the identity of the substrate composition and the brazing filler material composition. The flux can be applied to the brazing surface formed after the kinetic spray process by any of a variety of methods including: dry static powder application; dry powder spray application, dry powder deposition through a screen, dry smearing or dry brushing of a powder, running a wheel containing flux material over the brazing surface; spraying of a water-flux slurry, or dipping the brazing surface into a water-flux slurry. Typically, the flux is deposited through a screen as a dry powder onto the brazing surface and then the excess is removed by brushing the surface. Because of the mountains and valleys formed by the kinetically sprayed brazing surface the brazing surface is able to retain large amounts of the flux material as shown in FIGS. 4A and 4B. The amount of flux material required for a particular application varies widely from 2 to 50 grams per meter squared, more preferably from 2 to 35 grams per meter squared, and most preferably from 6 to 15 grams per meter squared. In FIG. 4A, a scanning electron micrograph photograph of a plane view of a brazing surface having deposited thereon 10 grams per meter squared of flux material is shown. As can be seen in FIG. 4A, the particles of the brazing filler material are shown at 80 and form a series of high spots with dry flux material 86 located between the high spots. In FIG. 4B, a brazing surface comprising particles 90 is shown with flux at a loading of 40 grams per meter squared shown at 96.

Figure 5:
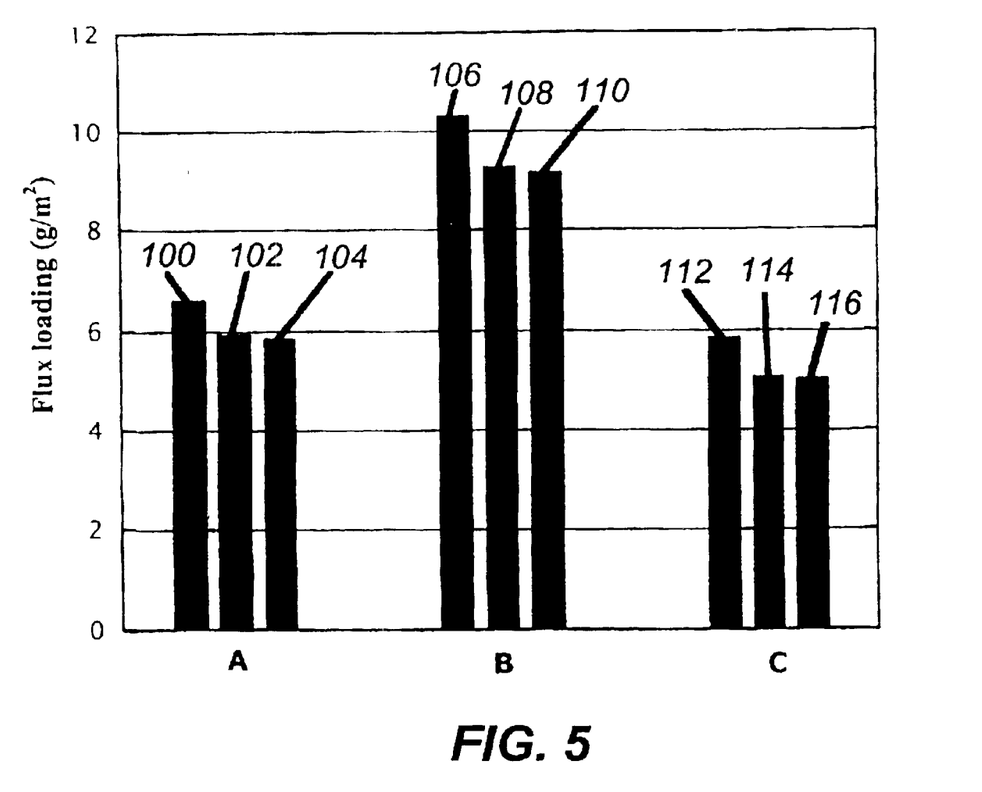
FIG. 5 is a graph demonstrating retention of a brazing flux material on a brazing surface before and after a series of drop tests for three samples according to the present invention.

In FIG. 5, the retention of a dry flux powder on the brazing surface was tested. Three specimens, A, B, and C, were each loaded with dry flux using a dry powder brush application. The specimens were 10 centimeter long aluminum tubes that had been kinetic spray coated with a brazing filler material comprising aluminum, zinc, and silicon. Each tube was dropped from a height of 5 centimeters onto a flat surface and the loading of flux on the surface before and after the drop test was recorded. Bars 100, 106, and 112 represent each specimen's flux loading prior to a first drop test. Bars 102, 108, and 114 represent the flux retention after a single drop. As shown in the figures, typically less than 10% flux falls off following the first drop test. Bars 104, 110, and 116 show the result of a subsequent drop test. As shown, there is negligible additional flux lost as a result of the second drop test. The results demonstrate that the brazing flux material applied in accordance with the present invention adheres well to the kinetically sprayed brazing surface in the complete absence of binders, adhesives or resins, which are necessary in prior art methods of applying flux material. The amount retained after the drop test is significant. Obviously, the amount of flux required is dependent on the brazing filler material, the surfaces to be joined and the flux, as known to those or ordinary skill in the art. Retention of at least 5% after a first drop step is preferred, more preferably at least 20% of the deposited flux material is retained after a first drop test, and most preferably at least 50% is retained after a first drop test.

Figure 6:
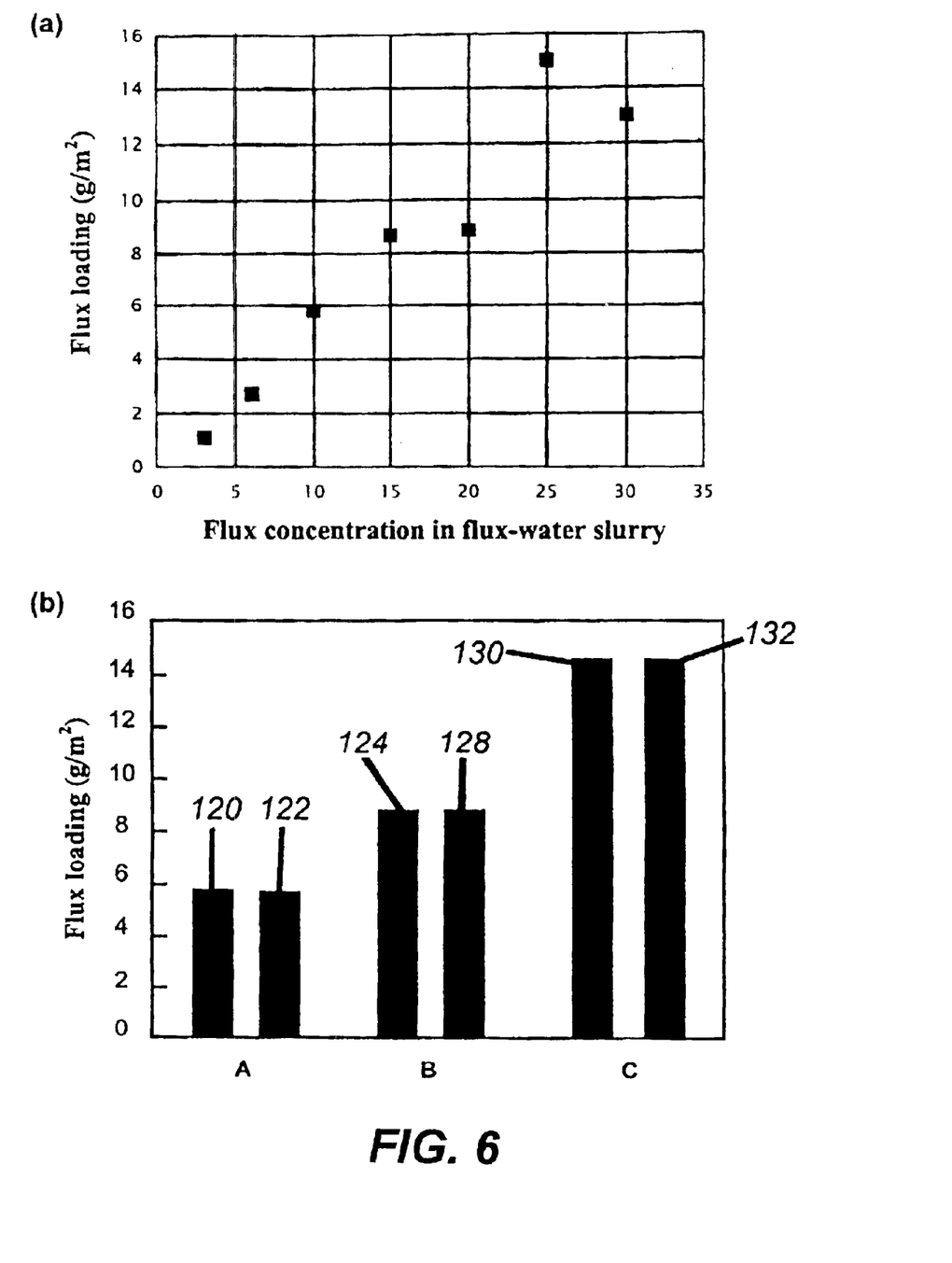
FIG. 6A is a graph showing the dependence of brazing flux loading onto a brazing surface on the brazing flux concentration in a water-brazing flux slurry according to the present invention.
FIG. 6B is a graph showing retention of the water-brazing flux slurry on three samples before and after a drop test according to the present invention.

In FIG. 6A, the effect of the flux concentration in a flux-water slurry mixture on the amount of flux loaded onto a sample is shown. All of the samples were applied by a spraying methodology and the excess water was removed by an air jet. As shown in FIG. 6B, the wet flux material readily adheres to the brazing surfaces. Three samples A, B, and C had the wet flux slurry applied to them and the initial flux loading is shown in bars 120, 124, and 130. The samples were then dropped vertically from a height of 5 centimeters above a flat surface and the flux retained after the drop is shown in bars 122, 128, and 132. As can be seen from FIG. 6B, there is negligible loss of the flux material following loading using a spray application of a wet flux-water slurry. The results demonstrate that the brazing flux material applied in accordance with the present invention adheres well to the kinetically sprayed brazing surface in the complete absence of binders, adhesives or resins, which are necessary in prior art methods of applying flux material. The amount retained after the drop test is significant. Obviously, the amount of flux required is dependent on the brazing filler material, the surfaces to be joined and the flux, as known to those or ordinary skill in the art. Retention of at least 5% after a first drop step is preferred, more preferably at least 20% of the deposited flux material is retained after a first drop test, and most preferably at least 50% is retained after a first drop test.

Figure 7:
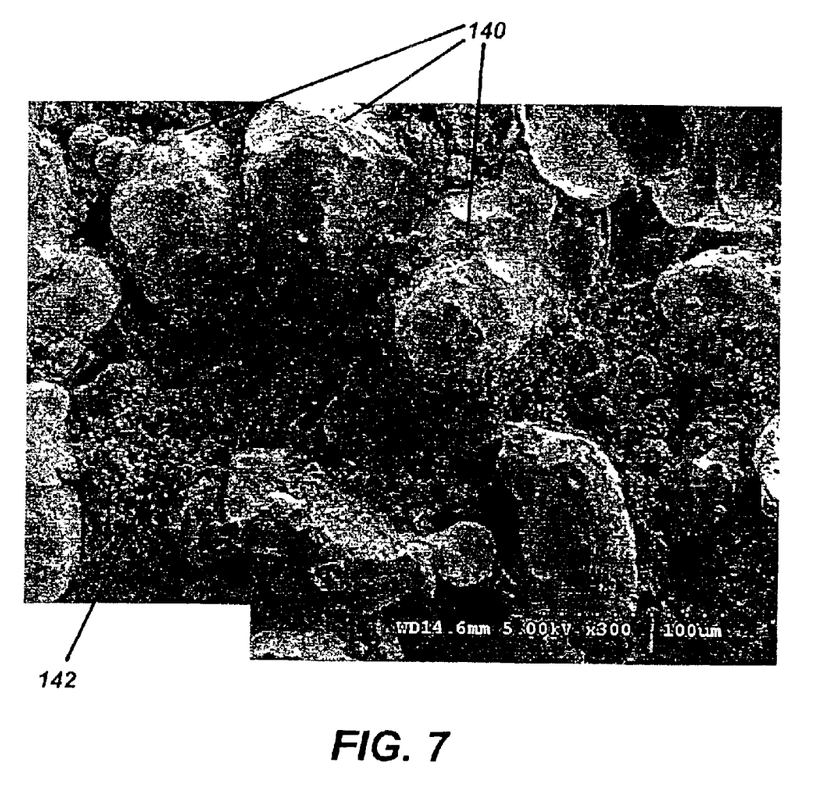
FIG. 7 is a scanning electronic micrograph photograph of a plane view of a brazing surface after application of 8 grams per meter squared of a water-brazing flux slurry to the surface according to the present invention.

FIG. 7 is a scanning electron micrograph photograph showing the brazing filler material 140 forming the brazing surface and the flux material 142 retained on the surface following application using a spray of a wet-flux slurry. The flux was loaded at a density of 8 grams per meter squared.

Figure 8:
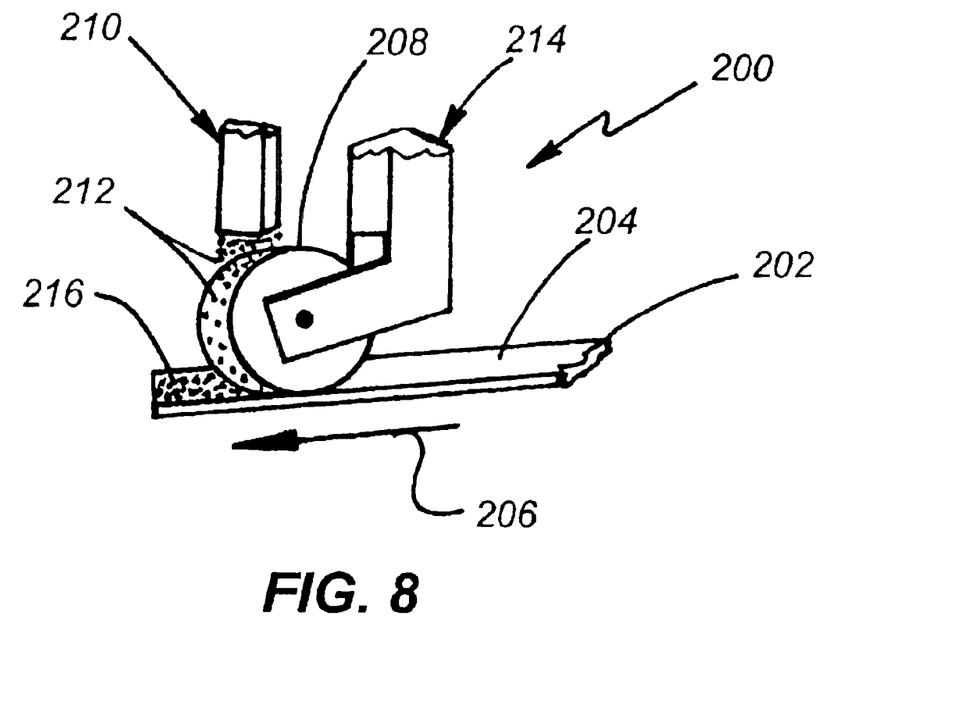
FIG. 8 is a drawing of a wheel for applying brazing flux material according to the present invention.

In FIG. 8 a system for application of a brazing flux material 212 is shown generally at 200. System 200 includes a wheel 208 that is rotatable within a bracket 214. A flux material feeder 210 deposits flux 212 onto a surface of the wheel 208. Bracket 214 holds wheel 208 against a brazing surface 204 that has been formed by a kinetic spray process as described above on a surface of a substrate 202. In FIG. 8 the substrate 202 is moving in the direction of arrow 206. Feeder 210 continuously applies flux 212 onto the surface of wheel 208 resulting in a fluxed brazing surface 216. The wheel 208 can be any sort of a wheel that will accept flux 212 and deposit the same onto a moving brazing surface 204. In a preferred embodiment, wheel 208 is a fabric wheel of the jewelers-type that readily accepts a powder flux 212. The system 200 is simple to operate and is one method of carrying out the present invention.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for application of a brazing flux material to a brazing surface comprising the steps of:
   a) providing a brazing filler material as a particle mixture wherein the average nominal particle size of the particle mixture is at least 65 microns, entraining the particle mixture into a flow of a gas, the gas at a temperature insufficient to cause thermal softening of the particle mixture, directing the particle mixture entrained in the flow of gas through a supersonic nozzle placed opposite a substrate, and accelerating the particle mixture to a velocity of from 300 to 1200 meters per second to result in adherence of the particle mixture onto the substrate thereby forming the brazing surface by a kinetic spray application;
   b) depositing a brazing flux material directly onto the formed brazing surface.

2. The method of claim 1, further comprising providing a particle mixture wherein the average nominal particle size of the particle mixture is from 65 to 250 microns.

3. The method of claim 1, comprising providing the gas at a temperature of from 300 to 3000 degrees Fahrenheit.

4. The method of claim 1, comprising providing a brazing filler material comprising an alloy or a metal.

5. The method of claim 1, further comprising providing the brazing filler material with a corrosion resistance material.

6. The method of claim 1, comprising providing the brazing filler material as a ternary mixture of aluminum, zinc, and silicon.

7. The method of claim 6, comprising providing the brazing filler material as a ternary mixture of from 50 to 78% by weight aluminum, 12 to 45% by weight zinc, and 5 to 10% by weight silicon all based on the total weight of the filler material.

8. The method of claim 1, wherein the brazing flux is deposited in at least one of the following ways: dry static powder, as a sifted dry powder, by dry powder brush application, as a dry powder smear, by running a wheel containing flux over the brazing surface, as a wet slurry by dip application, as a wet slurry by spraying application, or a mixture thereof.

9. The method of claim 1, further comprising depositing from 2 to 40 grams per meter squared of brazing flux material directly onto the brazing surface.

10. The method of claim 1, wherein step a) comprises applying the brazing filler material directly onto a substrate comprising a metal or an alloy by a kinetic spray application to form the brazing surface.

11. The method of claim 1, wherein step a) comprises applying the brazing filler material directly onto a substrate comprising aluminum by a kinetic spray application to form the brazing surface.

12. The method of claim 1, wherein step a) comprises applying from 50 to 150 grams per meter squared of brazing filler material directly onto the substrate by a kinetic spray application to form the brazing surface.

13. The method of claim 1, further comprising retaining at least 5% by weight of the applied flux material after dropping the substrate with brazing surface and applied flux material from a height of 5 centimeters onto a flat surface.

14. A method for application of a brazing flux material to a brazing surface comprising the steps of:
   a) providing a brazing filler material as a particle mixture wherein the average nominal particle size of the particle mixture is at least 65 microns, entraining the particle mixture into a flow of a gas, the gas at a temperature of from 300 to 3000 degrees Fahrenheit insufficient to cause thermal softening of the particle mixture, directing the particle mixture entrained in the flow of gas through a supersonic nozzle placed opposite a substrate, and accelerating the particle mixture to a velocity of from 300 to 1200 meters per second sufficient to result in adherence of the particle mixture onto the substrate thereby forming a brazing surface by a kinetic spray application; and
   b) depositing a brazing flux material directly onto the formed brazing surface.

15. The method of claim 14, further comprising providing a particle mixture wherein the average nominal particle size of the particle mixture is from 65 to 250 microns.

16. The method of claim 14, comprising providing a brazing filler material comprising an alloy or a metal.

17. The method of claim 14, further comprising providing the brazing filler material with a corrosion resistance material.

18. The method of claim 14, comprising providing the brazing filler material as a ternary mixture of aluminum, zinc, and silicon.

19. The method of claim 18, comprising providing the brazing filler material as a ternary mixture of from 50 to 78% by weight aluminum, 12 to 45% by weight zinc, and 5 to 10% by weight silicon all based on the total weight of the filler material.

20. The method of claim 14, wherein the brazing flux material is deposited in at least one of the following ways: dry static powder, as a sifted dry powder, by dry powder brush application, as a dry powder smear, by running a wheel containing flux over the brazing surface, as a wet slurry by dip application, as a wet slurry by spraying application, or a mixture thereof.

21. The method of claim 14, further comprising depositing from 2 to 40 grams per meter squared of brazing flux material directly onto the brazing surface.

22. The method of claim 14, wherein step a) comprises applying the brazing filler material directly onto a substrate comprising a metal or an alloy by a kinetic spray application to form the brazing surface.

23. The method of claim 14, wherein step a) comprises applying the brazing filler material directly onto a substrate comprising aluminum by a kinetic spray application to form the brazing surface.

24. The method of claim 14, wherein step a) comprises applying from 50 to 150 grams per meter squared of brazing filler material directly onto the substrate by a kinetic spray application to form the brazing surface.

25. The method of claim 14, further comprising retaining at least 5% by weight of the applied flux material after dropping the substrate with brazing surface and applied flux material from a height of 5 centimeters onto a flat surface.

* * * * *